US012615525B2

(12) United States Patent
Rok et al.

(10) Patent No.: US 12,615,525 B2
(45) Date of Patent: Apr. 28, 2026

(54) COMPUTERIZED SYSTEMS AND METHODS FOR WIRELESS ROAMING SIMULATION

(71) Applicant: PLUME DESIGN, INC., Palo Alto, CA (US)

(72) Inventors: Vidmar Rok, Ljubljana (SI); David Abram, Ljubljana (SI)

(73) Assignee: PLUME DESIGN, INC., Palo Alto, CA (US)

( * ) Notice: Subject to any disclaimer, the term of this patent is extended or adjusted under 35 U.S.C. 154(b) by 474 days.

(21) Appl. No.: 18/295,053

(22) Filed: Apr. 3, 2023

(65) Prior Publication Data

US 2024/0334213 A1      Oct. 3, 2024

(51) Int. Cl.
H04W 24/06          (2009.01)

(52) U.S. Cl.
CPC ................................... H04W 24/06 (2013.01)

(58) Field of Classification Search
CPC ..... H04W 24/06; H04W 84/12; H04W 88/08; H04B 17/14; H04B 17/318
See application file for complete search history.

(56) References Cited

U.S. PATENT DOCUMENTS

| | | | |
|---|---|---|---|
| 2007/0270195 A1 | 11/2007 | Liang | |
| 2019/0372684 A1* | 12/2019 | Partee | H04B 17/00 |
| 2021/0092582 A1* | 3/2021 | Mlinarsky | H04W 8/005 |

FOREIGN PATENT DOCUMENTS

| | | |
|---|---|---|
| CN | 115278756 A | 11/2022 |
| CN | 204031185 U | 12/2024 |

OTHER PUBLICATIONS

Search Report to corresponding EP Application No. 24168264.0 mailed Sep. 9, 2024 (7 pages).

* cited by examiner

*Primary Examiner* — Ayodeji O Ayotunde
(74) *Attorney, Agent, or Firm* — Nicholas Martin; Greenberg Traurig, LLP

(57)          ABSTRACT

Disclosed are systems and methods that provide a novel framework for testing and configuring user equipment (e.g., a client device, for example) based on wireless access point (AP) simulations provided via an AP device. The disclosed framework can operate to provide accurate and efficient testing and wireless configuration of modeled devices based on the AP simulations. The disclosed AP device operates to simulate a client device (e.g., a mobile device, for example) physically moving from one AP to another, which is enabled via a set of AP chambers that are associated with the AP device, thereby enabling roaming activities, testing and configuration from a single device (and without requiring the client device to physically move).

19 Claims, 7 Drawing Sheets

100

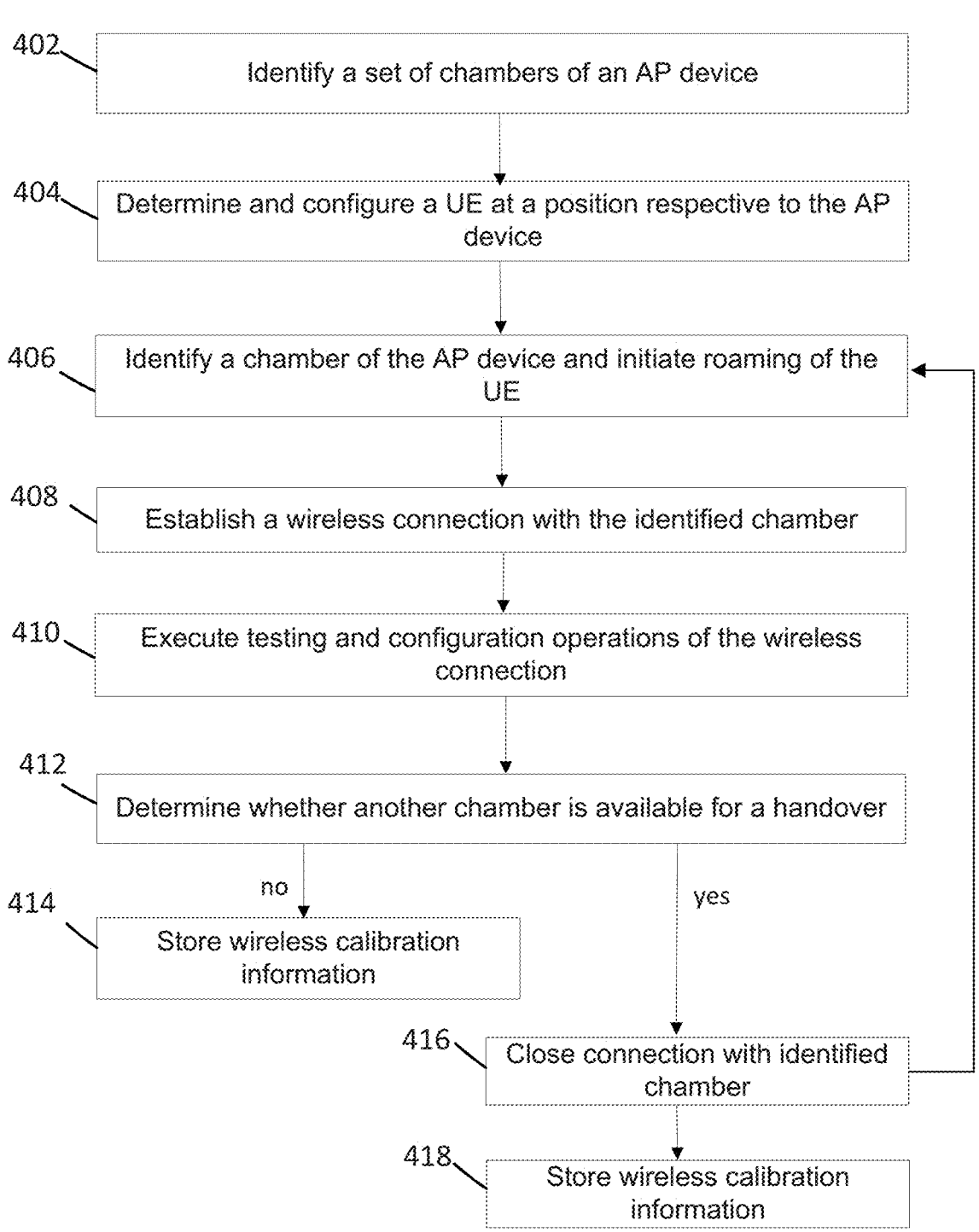

400

402 — Identify a set of chambers of an AP device

404 — Determine and configure a UE at a position respective to the AP device

406 — Identify a chamber of the AP device and initiate roaming of the UE

408 — Establish a wireless connection with the identified chamber

410 — Execute testing and configuration operations of the wireless connection

412 — Determine whether another chamber is available for a handover no

414 — Store wireless calibration information yes

416 — Close connection with identified chamber

418 — Store wireless calibration information

FIG. 4

Application

Platform

Infra-structure

Scenario Planning Interface:
Web Browser, Mobile App, Thin Client, Terminal Emulator, ...
604

SaaS
Scenario Simulation System Engines:
CRM, Email, Virtual Desktop, Communication, Games, ...
606

PaaS
Execution Runtime, Database, Web Server, Development Tools, ...
608

IaaS
Virtual Machines, Servers, Storage, Load Balancers, Network, ...
610

COMPUTERIZED SYSTEMS AND METHODS FOR WIRELESS ROAMING SIMULATION

FIELD OF THE DISCLOSURE

The present disclosure is generally related to a wireless roaming system, and more particularly, to a computerized framework for testing and configuring user equipment based on wireless access point (AP) simulations.

BACKGROUND

Wireless roaming occurs when a wireless device moves outside a usable range of one router or access point (AP) and connects to a different one. The device can switch from one router/AP to another router/AP as needed to provide network connectivity.

SUMMARY OF THE DISCLOSURE

According to some embodiments, the disclosed systems and methods provide a computerized framework that, via a novel access point (AP) device, as discussed herein, enables testing and configuration of devices and/or associated Wi-Fi capabilities within a defined geographic range.

According to some embodiments, as discussed herein, Wi-Fi roaming can be performed by a client device (e.g., the device connecting to a Wi-Fi signal(s)). Wi-Fi Standards organizations (e.g., IEEE 802.11 and Wi-Fi Alliance) may not specify when or how a client device should roam; thus, a wireless client device can be responsible for deciding if/when it needs to roam, as well as performing the operational steps of detecting, evaluating and roaming to another AP. In some embodiments, as provided below, such operational steps can involve scanning operations, authentication operations and re-association operations.

In some embodiments, such scanning can involve the client device communicating "probe" packets to identify possible alternative APs. Upon identification of another AP, the device can then select such AP, which in some embodiments, can be based on the specifications of the device itself. In some embodiments, as discussed below, such scanning can be based on a Wi-Fi signal weakening below a threshold value and/or the signal not being detectable/detected.

In some embodiments, authentication operations can involve the client device sending a request to the selected AP, whereby in response, the device can receive an acceptance or rejection/denial from the AP.

In some embodiments, with regard to re-association operations, when (and if) the AP accepts the client device's request, the client device can send another request, which can involve a disassociation packet to the former AP. Accordingly, in relation to the disassociation packet, the previous AP can then be deemed disconnected, whereby associated routing tables of the device can be updated.

Accordingly, the disclosed systems and methods provide a novel, device-based solution that solves the existing technical problems of testing roaming performance between APs of a wireless network or networks (e.g., Wi-Fi). As discussed in more detail below, according to some embodiments, the disclosed AP device operates to simulate a client device (e.g., a mobile device, for example) physically moving from one AP to another. In some embodiments, this can be enabled via a set of AP chambers that are associated with the AP device, thereby enabling roaming activities, testing and configuration from a single device (and without requiring the client device to physically move).

It should be understood that while the discussion herein will focus on Wi-Fi networks, it should not be construed as limiting, as the disclosed systems and methods discussed herein can be utilized for APs within any type of known or to be known wireless network, as discussed below.

According to some embodiments, a method is disclosed for a computerized framework for configuring user equipment (e.g., a user or client device, for example) based on wireless AP simulations. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for configuring user equipment based on wireless AP simulations.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 illustrates an exemplary workflow according to some embodiments of the present disclosure;

DETAILED DESCRIPTION

Figure 1:
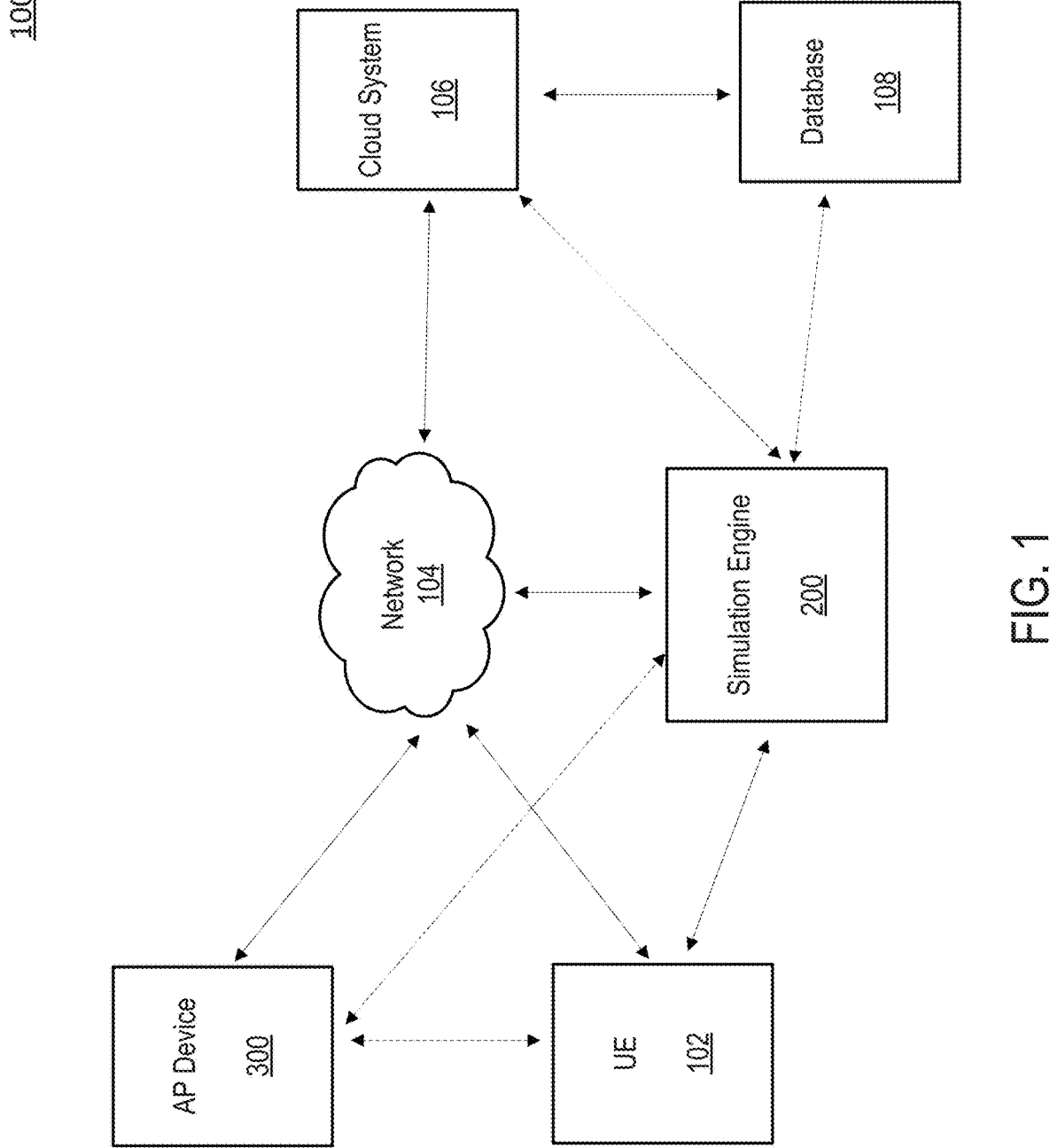
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments.

Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ different architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, 4th or 5th generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures. By way of background, with regard to many "on-market" shielded boxes (or conventional AP devices), it is often difficult to connect mesh Wi-Fi APs (which connect over the air together as each AP has to be in its own shielded environment). Accordingly, as discussed herein, the disclosed systems and methods provide an AP device and roaming/connection mechanisms for device testing and configuration. As provided below, the AP device can have a set of chambers, with each chamber being configured as an individual AP. Each AP can be accessible via opening of its associated chamber, as discussed below. Each AP associated with the AP device can be defined and/or associated with a radio frequency (RF)-attenuating foam (rather than a reflector), which enables connectivity and/or roaming between the AP device's associated APs.

Accordingly, the disclosed AP device provides a significant economic advantage over conventional shielded boxes which are very expensive. The disclosed device is cost-effective, and provides novel capabilities for simulating roaming between network locations (and/or geographical locations with different networks) from a single AP device. Moreover, as evident from the disclosure herein, the disclosed systems and methods can simulate a closer to-real-world experience of AP-roaming than existing shielded boxes. For example, the disclosed systems and methods can account for real-world scenarios, such as, for example Beamforming and multiple-input multiple-output (MIMO) communications via the disclosed AP device, which conventional shielded boxes are incapable of performing given their inherent configurations and material-based structures. Indeed, there is currently no known device that is configured with multiple access points for testing of a client device's roaming and connectivity capabilities, as discussed herein.

With reference to FIG. 1, system 100 is depicted which includes user equipment (UE) 102 (e.g., a client device, as mentioned above and discussed below in relation to FIG. 7), network 104, cloud system 106, database 108, simulation engine 200 and AP device 300. It should be understood that while system 100 is depicted as including such components, it should not be construed as limiting, as one of ordinary skill in the art would readily understand that varying numbers of UEs, peripheral devices, cloud systems, AP devices, engines, databases and networks can be utilized; however, for purposes of explanation, system 100 is discussed in relation to the example depiction in FIG. 1.

According to some embodiments, UE 102 can be any type of device, such as, but not limited to, a mobile phone, tablet, laptop, sensor, Internet of Things (IoT) device, autonomous machine, and any other device equipped with a cellular or wireless or wired transceiver. In some embodiments, UE 102 can be a device associated with an individual (or set of individuals).

In some embodiments, UE 102 can be connected to a peripheral device (not shown), and can be any type of peripheral device, such as, but not limited to, a wearable device (e.g., smart watch), printer, speaker, sensor, and the like. In some embodiments, a peripheral device can be any type of device that is connectable to UE 102 via any type of known or to be known pairing mechanism, including, but not limited to, Wi-Fi, Bluetooth™, Bluetooth Low Energy (BLE), NFC, and the like.

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a smart-home provider, which has associated network resources hosted on the internet or private network (e.g., network 104), which enables (via engine 200) the wireless AP roaming and connectivity discussed herein.

In some embodiments, cloud system 106 may include a server(s) and/or a database of information which is accessible over network 104. In some embodiments, a database 108 of cloud system 106 may store a dataset of data and metadata associated with local and/or network information related to AP device 300, UE 102, a user(s) of UE 102 and the services and applications provided by cloud system 106 and/or simulation engine 200.

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 5:
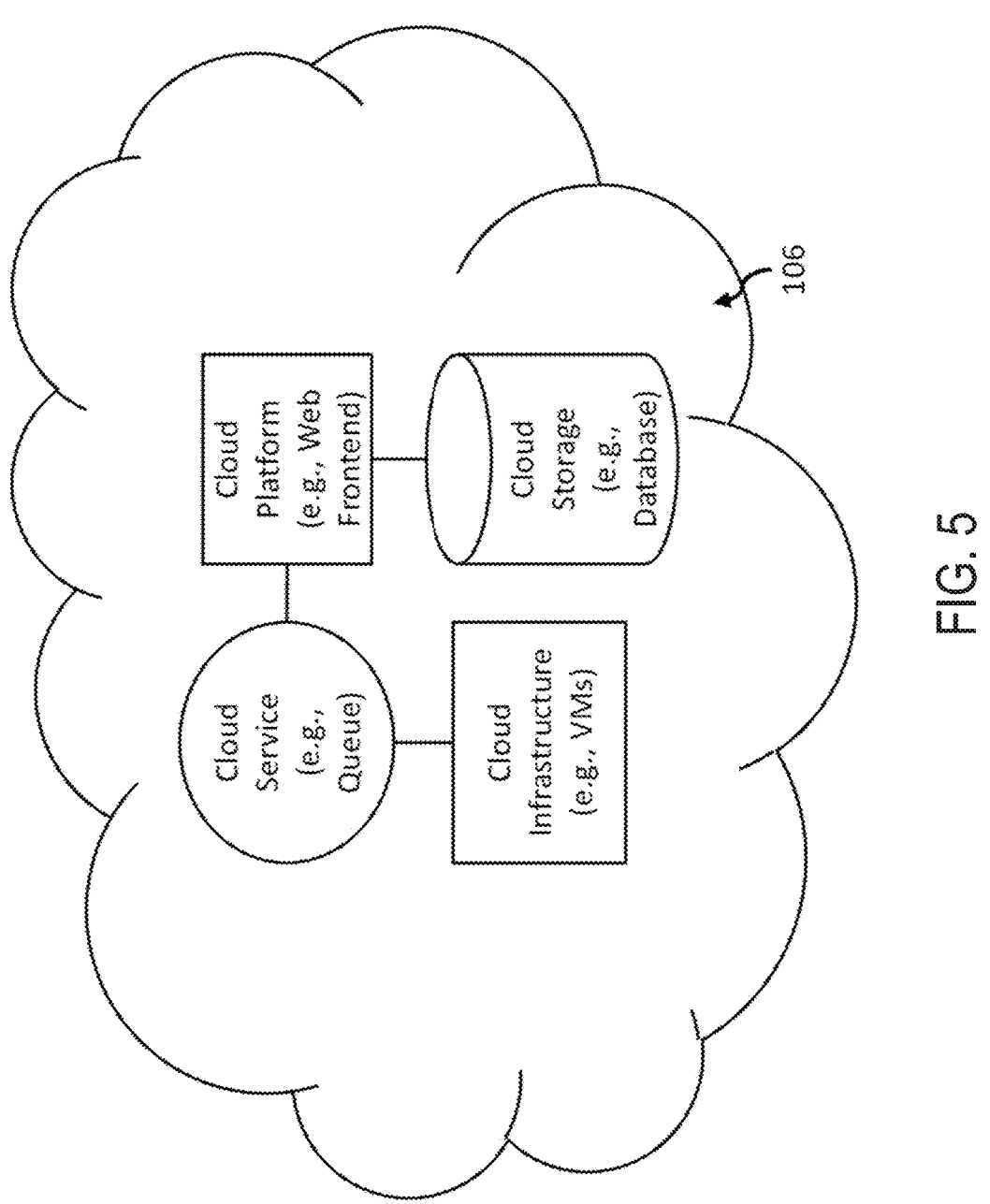
FIG. 5 depicts an exemplary implementation of an architecture according to some embodiments of the present disclosure.
Figure 6:
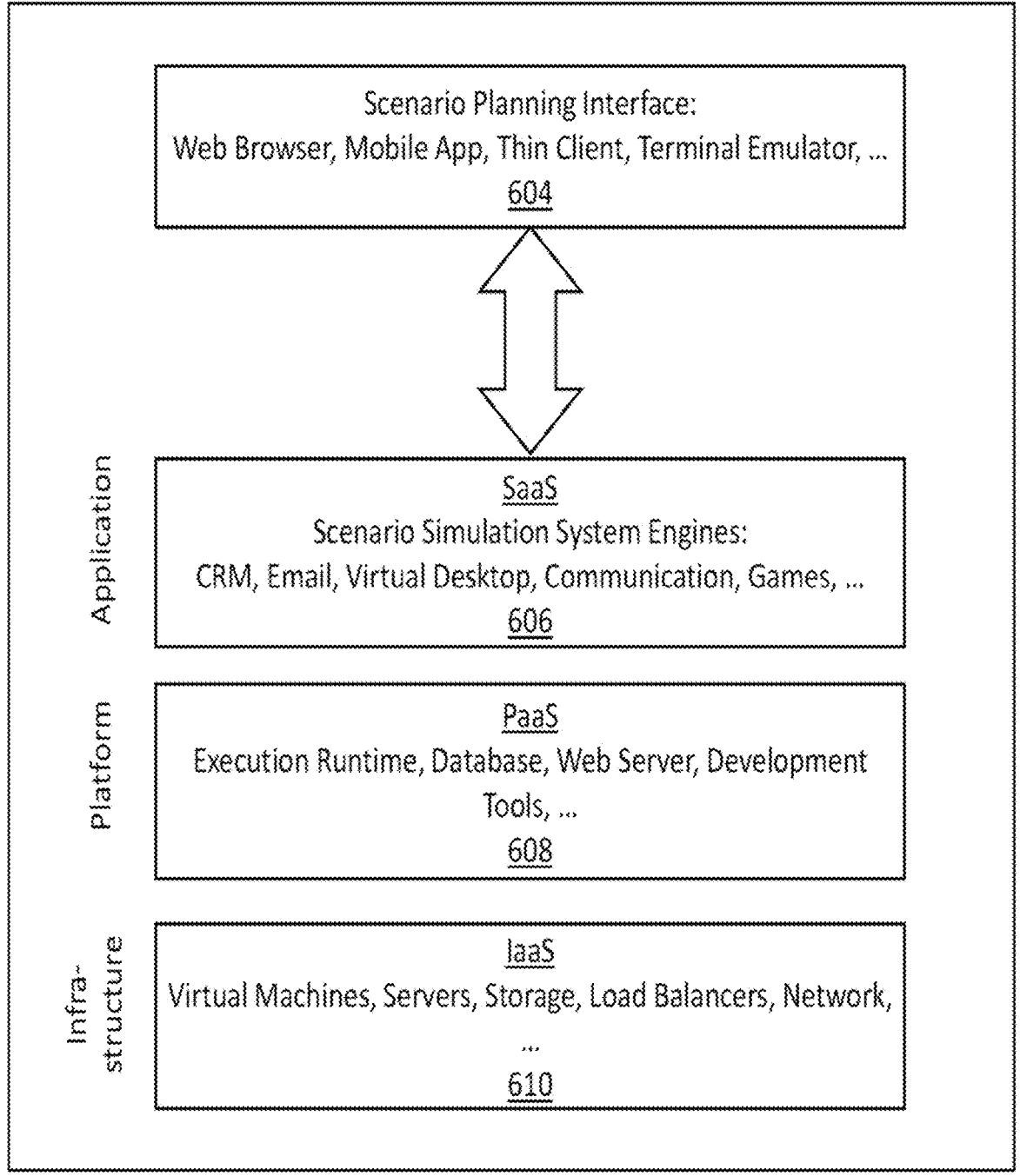
FIG. 6 depicts an exemplary implementation of an architecture according to some embodiments of the present disclosure.

Turning to FIG. 5 and FIG. 6, in some embodiments, the exemplary computer-based systems/platforms, the exemplary computer-based devices, and/or the exemplary computer-based components of the present disclosure may be specifically configured to operate in a cloud computing/architecture 106 such as, but not limiting to: infrastructure as a service (IaaS) 610, platform as a service (PaaS) 608, and/or software as a service (SaaS) 606 using a web browser, mobile app, thin client, terminal emulator or other endpoint 604. FIG. 5 and FIG. 6 illustrate schematics of non-limiting implementations of the cloud computing/architecture(s) in which the exemplary computer-based systems for administrative customizations and control of network-hosted APIs of the present disclosure may be specifically configured to operate.

Turning back to FIG. 1, according to some embodiments, database 108 may correspond to a data storage for a platform (e.g., a network hosted platform, such as cloud system 106, as discussed supra), a plurality of platforms, and/or UE 102 and/or AP device 300. Database 108 may receive storage instructions/requests from, for example, engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

Simulation engine 200, as discussed above and further below in more detail, can include components for the disclosed functionality. According to some embodiments, simulation engine 200 may be a special purpose machine or processor, and can be hosted by a device on network 104, within cloud system 106, on UE 102 (and/or a peripheral device) and/or on AP device 300, and the like. In some embodiments, engine 200 may be hosted by a server and/or set of servers associated with cloud system 106.

According to some embodiments, as discussed in more detail below, simulation engine 200 may be configured to implement and/or control a plurality of services and/or microservices, where each of the plurality of services/microservices are configured to execute a plurality of workflows associated with performing the disclosed network connectivity management. Non-limiting embodiments of such workflows and/or operating environments of such are provided below in relation to at least FIG. 3 and FIG. 4.

According to some embodiments, as discussed above, simulation engine 200 may function as an application provided by cloud system 106. In some embodiments, engine 200 may function as an application installed on a server(s), network location and/or other type of network resource associated with system 106. In some embodiments, engine 200 may function as an application installed and/or executing on UE 102 and/or AP device 300. In some embodiments, such application may be a web-based application accessed by UE 102 and/or AP device 300 over network 104 from cloud system 106. In some embodiments, engine 200 may be configured and/or installed as an augmenting script, program or application (e.g., a plug-in or extension) to another application or program provided by cloud system 106 and/or executing on UE 102 and/or AP device 300.

Figure 2:
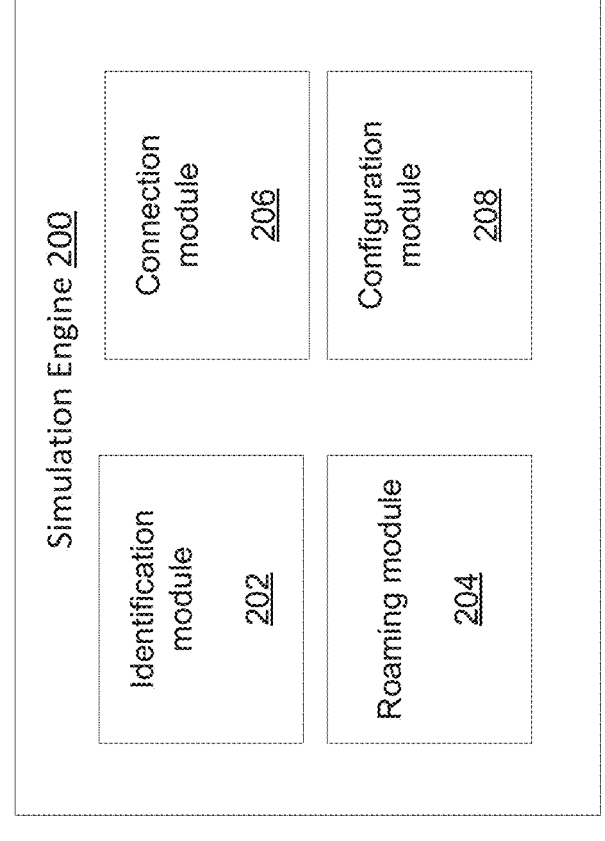
FIG. 2 is a block diagram illustrating components of an exemplary system according to some embodiments of the present disclosure.

As illustrated in FIG. 2, according to some embodiments, simulation engine 200 can include identification module 202, roaming module 204, connection module 206 and configuration module 208. It should be understood that the engine(s) and modules discussed herein are non-exhaustive, as additional or fewer engines and/or modules (or submodules) may be applicable to the embodiments of the systems and methods discussed. More detail of the operations, configurations and functionalities of engine 200 and each of its modules, and their role within embodiments of the present disclosure will be discussed below.

Figure 3:
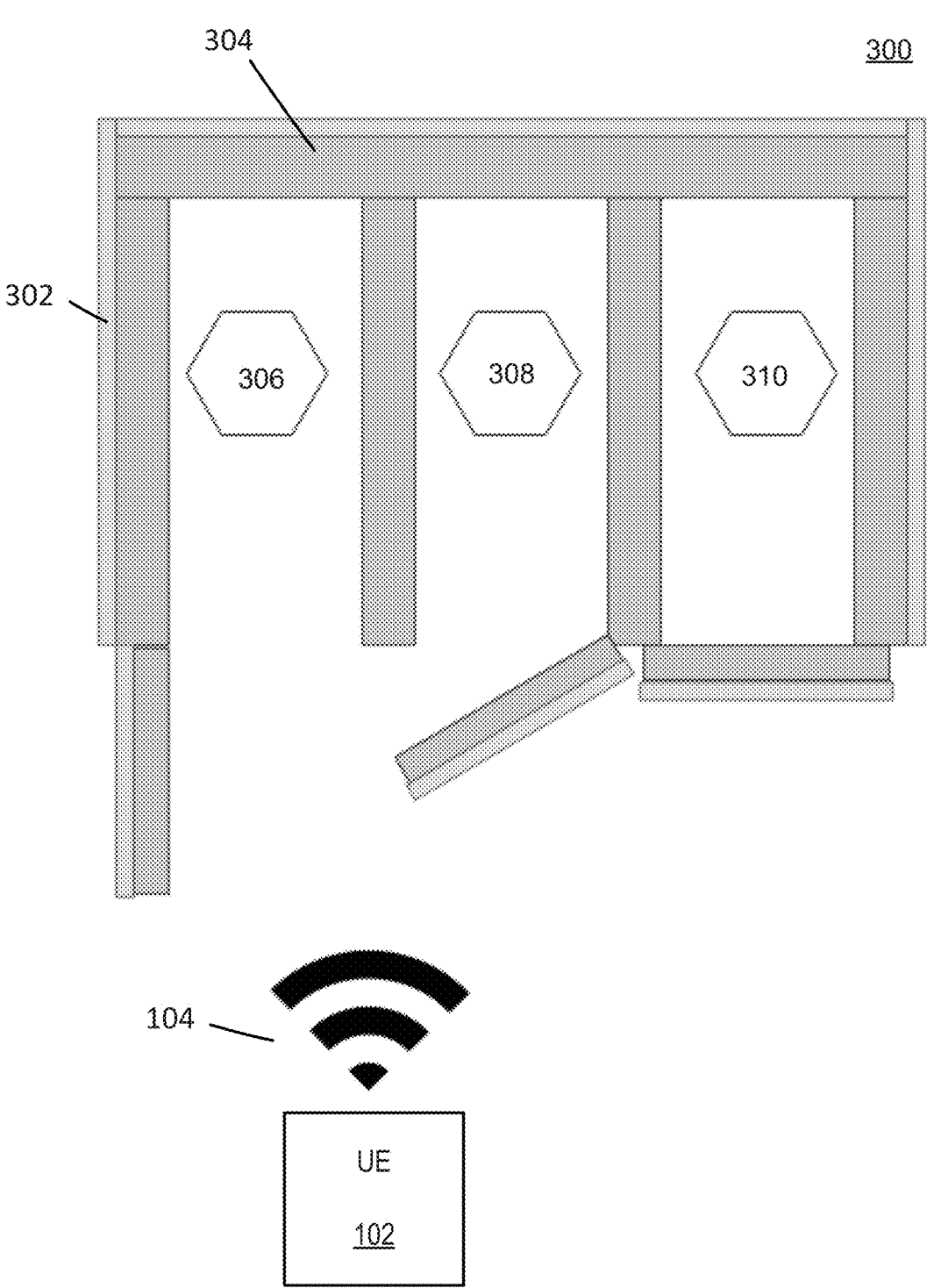
FIG. 3 illustrates a non-limiting example operating environment according to some embodiments of the present disclosure.

Turning to FIG. 3, depicted is a non-limiting example operating environment for an exemplary AP device 300. According to some embodiments, depicted are AP device 300 and UE 102, which can wirelessly connect to the associated access points of AP device 300 via network 104 (e.g., Wi-Fi networks, for example), as discussed herein.

According to some embodiments, AP device 300 can include an outer layer 302 and an inner layer 304. In some embodiments, the outer layer 302 can be configured as a reflector, which can be any type of conductive metal, for example, aluminum. As provided below, the outer layer 302 enables isolation or non-connectivity of the APs of device 300 from UE 102 (e.g., mobile device, for example), which can only be enabled upon opening of an opening of an AP's chamber, such as an aperture or door (referred to as a "door" herein for consistency), whereby the associated AP becomes available for connection. This is discussed further below, at least in relation to FIG. 4.

In some embodiments, inner layer 304 can be configured as a radio absorber of any type of known or to be known foam material. In some embodiments, inner layer can be configured at a thickness according to a predefined thickness range, for example, 55-65 mm. In some embodiments, for example, the inner layer 304 can be a thickness of 60 mm. As discussed below, such thickness can enable isolation of an AP within a chamber, yet maintain a capable connectivity between APs within AP device 300.

In some embodiments, AP device 300 may include one of an outer layer and inner layer. That is, in some embodiments, for example, AP device 300 may only include a foam radio absorber; and in some embodiments, AP device 300 may only include an RF-reflector. Accordingly, implementation and the disclosed functionality of AP device 300 can still be provided via the disclosed mechanisms discussed herein via such embodiments.

According to some embodiments, AP device 300 can be configured with a set of chambers, as depicted in FIG. 3, where each chamber can correspond to a dedicated AP and/or network. For example, each chamber can provide an AP via a gateway or router for enabling connectivity to a provided network (thus, for example, each AP includes a network interface for a specified network). For example, as in FIG. 3, AP device 300 includes chambers 306, 308 and 310. It should be understood that while the discussion herein will focus on the AP device 300 having three (3) chambers, it is not so limiting, as AP device 300 can be scaled and/or configured with any number of chambers ranging from 2 to n chambers without departing from the scope of the instant disclosure.

In some embodiments, as depicted in FIG. 3, each chamber 306-310 can be divided by inner layer 304 (e.g., a radio absorber material). Such configuration can enable attenuation of signals between each chamber (e.g., Wi-Fi mesh APs) at a threshold level (e.g., 20 dB, for example), whereby each AP can still connect to each other (within AP device 300). In some embodiments, the threshold level of attenuation can be based on a thickness, type and specification of the inner layer 304 that divides the chambers 306-310. Each chamber 306-310 can be covered from the outside with the outer layer 302 (e.g., RF-reflector), which as discussed above, can prevent signals from spreading into the environment outside the chambers (to UE 102, for example).

In some embodiments, each chamber 306-310 can be associated with a different type of network, differently configured network, and the like, or some combination thereof. For example, chamber 306 can include an AP for a 5G network, chamber 308 can include an AP for a 4G network, and chamber 310 can include an AP for a Wi-Fi network. In another non-limiting example, chamber 306 can include an AP for a 2.4 GHz Wi-Fi network and chamber 308 can include an AP for a 5 GHz network. An in yet another example, each AP within chambers 306-310 can be for a similar network (e.g., Wi-Fi 2.4 GHz network), but from a different network provider and/or via a differing type or model of router, for example.

As discussed below in more detail, AP device 300 can attenuate a signal to UE 102 according to a predetermined decibel (e.g., 20 dB, for example). As discussed below, such attenuation can be enabled and/or provided via the opening and/or closing of the doors of AP device 300. According to some embodiments, such decibel level can enable UE 102 to roam from one Wi-Fi AP to another Wi-Fi AP—for example, from chamber 306 to chamber 308.

Accordingly, in some embodiments, any sequence and/or combination of chamber roaming can be enabled via AP device 300—for example, roaming can be enabled from chamber 306 to chamber 308; from chamber 306 to chamber 310; from chamber 308 to chamber 306; from chamber 308 to chamber 310; from chamber 310 to chamber 306; from chamber 310 to chamber 308; and the like, or some combination thereof.

By way of a non-limiting example, as in FIG. 3, UE 102 is depicted as being connected to the AP provided by chamber 306. This can be realized via the opened "door" of chamber 306. Note, the door of chamber 308 is half-opened (or in the process of opening), and the door of chamber 310 is closed. Thus, UE 102 cannot connect to the AP of chamber 310, and would not connect to the AP of chamber 308 since the door of chamber 306 remains open.

For example, the signals provided by APs of chambers 306-310 are set at −65 dBm (when the doors of the chambers 306-310 are opened), attenuation is 20 dB, and the predetermined threshold for roaming is −75 dBm.

Thus, when the door of chamber 306 closes (or closes a threshold amount of degrees to cause at least a 20 dB attenuation), UE 102 can enter roaming mode. For example, the connected signal between UE 102 and chamber 306's AP drops below the −75 dBm threshold: from −65 dBm to −85 dBm (via the 20 dB attenuation of the door closing). Upon the door of chamber 308 opening at least a threshold amount (e.g., to enable connectivity to the respective AP of chamber 308), UE 102 can detect and connect to such AP of chamber 308. Similarly, such processing can occur respective to chamber 310 and/or (back to) chamber 306.

As such, as discussed below, upon connection to an AP, connectivity and/or configuration of UE 102's network interface(s) can be tested and configured according to the test networks provided by the respective APs of AP device 300.

Turning to FIG. 4, Process 400 provides non-limiting example embodiments for the deployment and/or implementation of the disclosed security management framework.

According to some embodiments, Steps 402-404 of Process 400 can be performed by identification module 202 of simulation engine 200; Steps 406 and 412 can be performed by roaming module 204; Steps 408 and 416 can be performed by connection module 206; and Steps 410, 414 and 418 can be performed by configuration module 208.

According to some embodiments, Process 400 begins with Step 402 where engine 200 identifies an AP device 300, and the set of chambers therein. For example, as depicted in FIG. 3, AP device 300 has three (3) chambers 306, 308 and 310, and each has a corresponding access point for a specific type of network, as discussed above.

In Step 404, engine 200 can determine and configure a UE at a position respective to the AP device. For example, the UE is a mobile device, and the mobile device is positioned at a physical distance from the AP device so that the mobile device can receive a network signal at a predetermined threshold amount of strength. For example, if the signal strength is -65 dBm, then the UE can be placed x distance away from the AP device (e.g., in an x, y and/or z direction). In some embodiments, the correct signal strength (e.g., −65 dBm, for example) can be obtained via an RF-attenuator foam being associated with the UE (e.g. the foam can be positioned physically between the UE and AP device, which can be configured the signal strength to a desired/correct value.

In some embodiments, the signal strength can be based on a decibel threshold and an attenuation value of the AP device. For example, the signal strength driving the positioning of the UE can be selected to ensure that attenuation causes the UE to enter roaming mode in search of another AP, as discussed above.

In Step 406, engine 200 can identify a chamber of the AP device an initiate roaming of the UE. For example, with reference to FIG. 3, engine 200 can detect that the door of chamber 306 of AP device 300 is open such that the signal strength detected by the UE 102 equals to or at least surpasses-65 dBm. Thus, for example, by the door of chamber 306 opening, the signal from the AP of chamber 306 attenuated 20 dB in strength. In some embodiments, engine 200 can cause the door of the chamber to open (e.g., via a stepper motor, for example, as discussed below).

In Step 408, engine 200 can effectuate, facilitate and/or enable the establishment of a wireless connection between the UE and the AP of the identified chamber. For example, UE 102 is connected to network 104, as provided by the AP of chamber 306. For example, UE 102 can have a connection with a signal strength of −65 dBm with the AP of chamber 306 (as per Step 404).

In Step 410, engine 200 can execute testing and configuration operations of the wireless connection. According to some embodiments, such testing and configuration operations can correspond to, but are not limited to, speeds, latency, packet loss, bandwidth, security, and the like. In some embodiments, engine 200 can utilize a Wi-Fi analyzer and/or any other type of application or program to test and configure the wireless connection between the UE and the identified chamber of the AP device.

In some embodiments, engine 200 can alter, modify and/or set up or configure certain network settings and/or UE settings so as to enable optimized connectivity between the UE and the AP of the chamber. For example, if engine 200 determines that UE is suffering from packet loss beyond a threshold, then engine 200 can attempt to update the software on the UE to address an underlying issue of packet loss as caused by an identified software issue on the UE. In another non-limiting example, engine 200 can update the APs in each chamber (e.g., change their type of network characteristics, for example).

According to some embodiments, such testing and configuration as performed in Step 410 via engine 200 can be based on collected network and/or device data that is subject to an executed computational analysis and determination via any type of known or to be known computational analysis technique, algorithm, mechanism or technology. In some embodiments, engine 200 may include a specific trained artificial intelligence/machine learning model (AI/ML), a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 may be configured to utilize one or more AI/ML techniques selected from, but not limited to, computer vision, feature vector analysis, decision trees, boosting, support-vector machines, neural networks, nearest neighbor algorithms, Naive Bayes, bagging, random forests, logistic regression, and the like. By way of a non-limiting example, engine 200 can implement an XGBoost algorithm for regression and/or classification to analyze the device/network data, as discussed herein.

According to some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:

a. define Neural Network architecture/model,
    b. transfer the input data to the neural network model,
    c. train the model incrementally,
    d. determine the accuracy for a specific number of timesteps,
    e. apply the trained model to process the newly-received input data,
    f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

Thus, in some embodiments, engine 200 can execute an AI/ML model to ensure the testing of the connected AP is optimized so as to enable accurate configuration of the UE's roaming capabilities.

In Step 412, engine 200 can determine whether another chamber is available for a handover to another AP. In some embodiments, Step 412 can be triggered via the door of the identified chamber closing, as discussed above. In some embodiments, Step 412 can be based on the signal strength of the connection between UE and the AP of the identified chamber dropping below the decibel threshold. For example, the −65 dBm connection with the AP drops to −85 dBm due to the attenuation of the signal from the AP via the door of the AP's chamber closing (as discussed above at least in relation to FIG. 3).

According to some embodiments, the door of the chamber can be closed based on, but not limited to, user input, a time period, a duration of connection, and the like, or some combination thereof. For example, the door can be closed upon engine 200 determining that a time period for testing has ended, and a time for another AP is to commence (or the AP device is done with testing with no other APs/chambers). Accordingly, in some embodiments, engine 200 can automatically trigger the closing of a chamber's door (and the opening of another chamber's door).

In some embodiments, a door can be opened and/or closed by engine 200 executing a motor (e.g., a stepper motor), which can cause each door to open at predetermined and/or dynamically determined rates. For example, a door can open at a specific speed, and close at another speed so as to enable a gradual attenuation.

In some embodiments, engine 200 can determine that no other chambers exist on the AP device 300, therefore, processing of Process 400 can proceed from Step 412 to Step 414. In Step 414, the wireless calibration information of the UE can be stored in database 108, as discussed above. For example, the calibration information can indicate device configurations of the UE's connectivity to the AP of the identified chamber, which can include information related to, but not limited to, network identifier, testing duration, types of testing, network type, network speed, network latency, packet loss, network bandwidth, device and/or network security, and the like, or some combination thereof.

In some embodiments, when engine 200 determines that other chambers exist on the AP device for testing, processing of Process 400 can proceed from Step 412 to Step 416. In Step 416, engine 200 can close the connection with the identified chamber, which as discussed above, can involve the closing of the door of the chamber (e.g., that causes attenuation of the signal below the signal threshold) and/or a disassociation signal, for example.

In some embodiments, engine 200 can proceed recursively back to Step 406, where a next chamber in the set of chambers can be opened, and the processing of Process 400 is recursively performed for the next chamber. In some embodiments, engine 200 can perform such recursive processing for each of the n chambers in the AP device (as identified in Step 402).

In some embodiments, in Step 418, engine 200, for each identified chamber in the recursive processing, can store the calibration information, which can be performed in a similar manner as discussed above (at least in relation to Step 414, supra).

Figure 7:
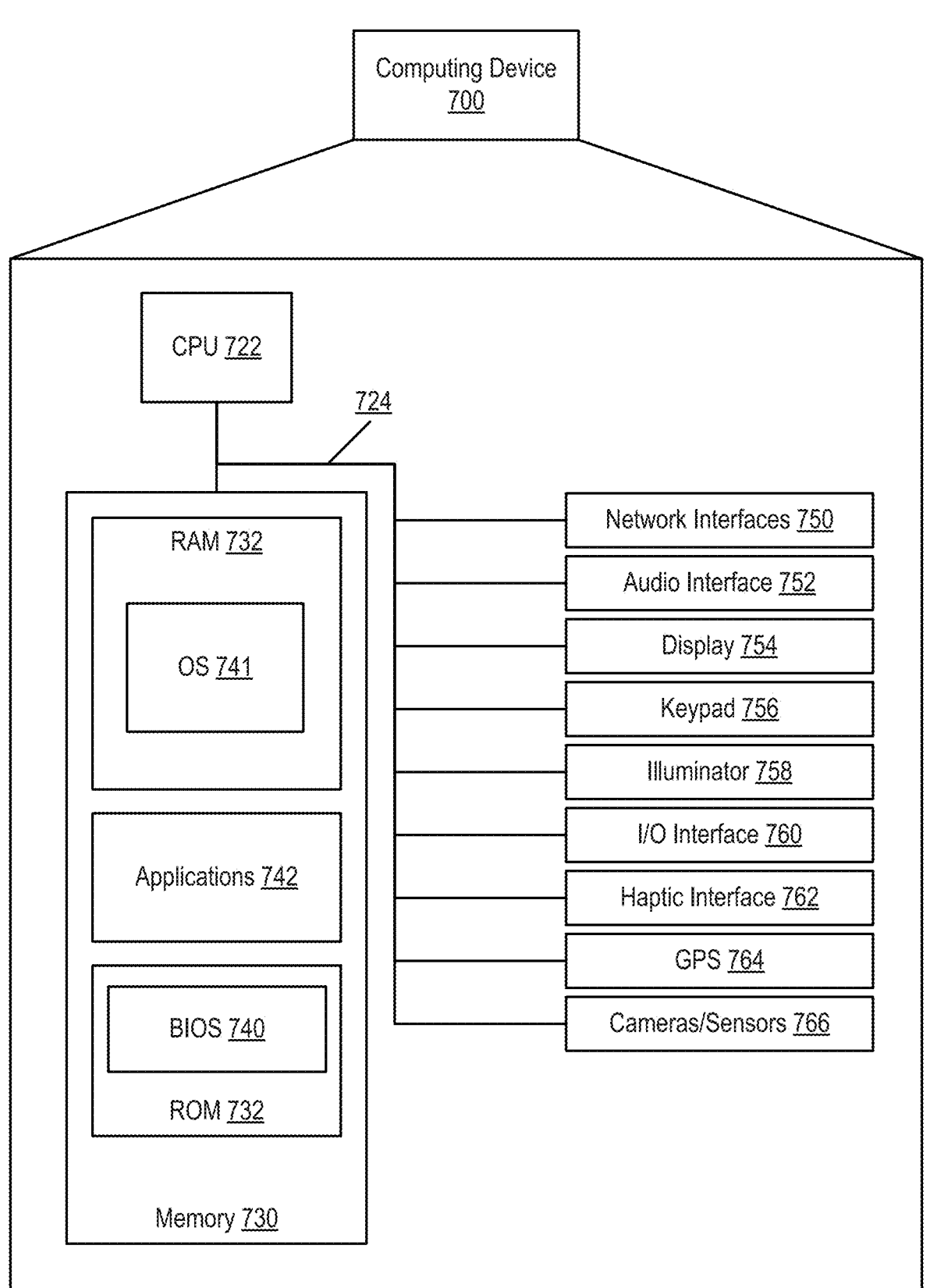
FIG. 7 is a block diagram illustrating a computing device showing an example of a client or server device used in various embodiments of the present disclosure.

FIG. 7 is a schematic diagram illustrating a client device showing an example embodiment of a client device that may be used within the present disclosure. Client device 700 may include many more or less components than those shown in FIG. 7. However, the components shown are sufficient to disclose an illustrative embodiment for implementing the present disclosure. Client device 700 may represent, for example, UE 102 discussed above at least in relation to FIG. 1.

As shown in the figure, in some embodiments, Client device 700 includes a processing unit (CPU) 722 in communication with a mass memory 730 via a bus 724. Client device 700 also includes a power supply 726, one or more network interfaces 750, an audio interface 752, a display 754, a keypad 756, an illuminator 758, an input/output interface 760, a haptic interface 762, an optional global positioning systems (GPS) receiver 764 and a camera(s) or other optical, thermal or electromagnetic sensors 766. Device 700 can include one camera/sensor 766, or a plurality of cameras/sensors 766, as understood by those of skill in the art. Power supply 726 provides power to Client device 700.

Client device 700 may optionally communicate with a base station (not shown), or directly with another computing device. In some embodiments, network interface 750 is sometimes known as a transceiver, transceiving device, or network interface card (NIC).

Audio interface 752 is arranged to produce and receive audio signals such as the sound of a human voice in some embodiments. Display 754 may be a liquid crystal display (LCD), gas plasma, light emitting diode (LED), or any other type of display used with a computing device. Display 754 may also include a touch sensitive screen arranged to receive input from an object such as a stylus or a digit from a human hand.

Keypad 756 may include any input device arranged to receive input from a user. Illuminator 758 may provide a status indication and/or provide light.

Client device 700 also includes input/output interface 760 for communicating with external. Input/output interface 760 can utilize one or more communication technologies, such as USB, infrared, Bluetooth™, or the like in some embodiments. Haptic interface 762 is arranged to provide tactile feedback to a user of the client device.

Optional GPS transceiver 764 can determine the physical coordinates of Client device 700 on the surface of the Earth, which typically outputs a location as latitude and longitude values. GPS transceiver 764 can also employ other geo-positioning mechanisms, including, but not limited to, tri-angulation, assisted GPS (AGPS), E-OTD, CI, SAI, ETA, BSS or the like, to further determine the physical location of client device 700 on the surface of the Earth. In one embodiment, however, Client device may through other components, provide other information that may be employed to determine a physical location of the device, including for example, a MAC address, Internet Protocol (IP) address, or the like.

Mass memory 730 includes a RAM 732, a ROM 734, and other storage means. Mass memory 730 illustrates another example of computer storage media for storage of information such as computer readable instructions, data structures, program modules or other data. Mass memory 730 stores a basic input/output system ("BIOS") 740 for controlling low-level operation of Client device 700. The mass memory also stores an operating system 741 for controlling the operation of Client device 700.

Memory 730 further includes one or more data stores, which can be utilized by Client device 700 to store, among other things, applications 742 and/or other information or data. For example, data stores may be employed to store information that describes various capabilities of Client device 700. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 700.

Applications 742 may include computer executable instructions which, when executed by Client device 700, transmit, receive, and/or otherwise process audio, video, images, and enable telecommunication with a server and/or another user of another client device. Applications 742 may further include a client that is configured to send, to receive, and/or to otherwise process gaming, goods/services and/or other forms of data, messages and content hosted and provided by the platform associated with engine 200 and its affiliates.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

16

What is claimed is:

1. An apparatus comprising:
a set of chambers, each chamber providing an access point (AP) of a network for a client device, wherein:
   each chamber comprises an inner layer configured to attenuate signals of each respective AP, and
   each chamber comprising a door for enabling the client device to connect to the AP via the attenuated signals; and
an outer layer comprising a radio frequency (RF) reflector, the outer layer configured to isolate the signals from each AP from the client device via the RF reflector, wherein a network connection between a respective AP and the client device is enabled via a respective door of a chamber of the respective AP being opened.

2. The apparatus of claim 1, wherein the inner layer is a radio absorber material, wherein the radio absorber material is foam.

3. The apparatus of claim 1, wherein the RF reflector is a metal material.

4. The apparatus of claim 1, wherein the network of each AP is a Wi-Fi network, wherein each Wi-Fi network is at least one of a different type and configuration, wherein each Wi-Fi network comprises different network parameters.

5. The apparatus of claim 1, further comprising:
a motor for opening the door of each chamber in the set of chambers.

6. The apparatus of claim 1, wherein the door of each chamber comprises the inner layer and the outer layer.

7. The apparatus of claim 1, wherein each AP is configured at a predetermined signal strength, wherein the attenuation of the signals is based on a predetermined attenuation value for each door.

8. The apparatus of claim 1, wherein the client device is configured with a threshold signal strength that causes roaming between the APs.

9. The apparatus of claim 1, wherein the set of chambers comprises at least two chambers.

10. A method comprising the steps of:
identifying, from a set of chambers of an access point (AP) device, a first chamber, each of the set of chambers comprising an AP to a different type of network;
causing opening of the first chamber, the opening of the first chamber enabling connectivity with an AP of the first chamber;
causing a wireless connection between a client device and the AP of the first chamber, the wireless connection enabling the client device to connect to a respective network of the first AP;
testing the wireless connection by the client device, the testing enabling a network configuration for the client device for the respective network of the first AP; and
storing network calibration information for the client device respective to the first AP.

11. The method of claim 10, further comprising:
identifying a second chamber from the set of chambers, wherein the identification of the second chamber is based on a roaming operation of the client device; and
causing a wireless connection between the client device and the AP of the second chamber, the wireless connection enabling the client device to connect to a respective network of the second AP.

12. The method of claim 11, further comprising:
testing the wireless connection with the second AP, the testing enabling a network configuration for the client device for the respective network of the second AP; and storing network calibration information for the client device respective to the second AP.

13. The method of claim 12, further comprising:

detecting a signal strength of the wireless connection with the first AP is below a predetermined signal strength for the AP device, wherein the identification of the second chamber is based on the signal strength detection; and causing opening of the second chamber from the set of chambers.

14. The method of claim 13, wherein the detection of the signal strength is based on a closing of the first chamber, wherein closing of the first chamber causes the signal strength of the wireless connection to attenuate a value below the predetermined signal strength.

15. The method of claim 13, wherein the client device is positioned a predetermined distance from the AP device, wherein the predetermined distance is based on the predetermined signal strength.

16. The method of claim 10, wherein the testing is performed for each of the APs of the AP device.

17. The method of claim 16, wherein the client device is configured based on the testing of each of the APs.

18. A non-transitory computer-readable storage medium tangibly encoded with computer-executable instructions that when executed by a processor, perform a method comprising:

identifying, from a set of chambers of an access point (AP) device, a first chamber, each of the set of chambers comprising an AP to a different type of network;

causing opening of the first chamber, the opening of the first chamber enabling connectivity with an AP of the first chamber;

causing a wireless connection between a client device and the AP of the first chamber, the wireless connection enabling the client device to connect to a respective network of the first AP;

testing the wireless connection by the client device, the testing enabling a network configuration for the client device for the respective network of the first AP; and storing network calibration information for the client device respective to the first AP.

19. The non-transitory computer-readable storage medium of claim 18, further comprising:

identifying a second chamber from the set of chambers, wherein the identification of the second chamber is based on a roaming operation of the client device; and causing a wireless connection between the client device and the AP of the second chamber, the wireless connection enabling the client device to connect to a respective network of the second AP.

* * * * *